(12) United States Patent
Lichtenfeld et al.

(10) Patent No.: US 7,512,420 B2
(45) Date of Patent: Mar. 31, 2009

(54) SYSTEM AND METHOD FOR TRANSMITTING AND DISPLAY OF VISUAL MESSAGES ON SCREENS OF CONNECTED MOBILE DEVICES

(75) Inventors: Dan Lichtenfeld, Nicosia (CY); Pinhas Roisman, Nicosia (CY); Sean Farhi, Nicosia (CY)

(73) Assignee: Mobiliad Investments & Trading Ltd., Nicosia (CY)

( * ) Notice: Subject to any disclaimer, the term of this patent is extended or adjusted under 35 U.S.C. 154(b) by 0 days.

(21) Appl. No.: 11/883,848

(22) PCT Filed: Feb. 6, 2006

(86) PCT No.: PCT/US2006/004203

§ 371 (c)(1),
(2), (4) Date: Aug. 7, 2007

(87) PCT Pub. No.: WO2006/086353

PCT Pub. Date: Aug. 17, 2006

(65) Prior Publication Data

US 2008/0160964 A1    Jul. 3, 2008

Related U.S. Application Data

(60) Provisional application No. 60/650,212, filed on Feb. 7, 2005.

(51) Int. Cl.
*H04M 1/00* (2006.01)

(52) U.S. Cl. .................... 455/566; 455/466; 455/414.1; 455/412.1

(58) Field of Classification Search ................ 455/566, 455/466, 414, 1, 412.1
See application file for complete search history.

(56) References Cited

U.S. PATENT DOCUMENTS

| 6,668,177 B2 | 12/2003 | Salmimaa et al. |
| 6,792,280 B1 | 9/2004 | Hori et al. |
| 7,162,226 B2 | 1/2007 | Papulov |
| 2002/0007401 A1* | 1/2002 | Suzuki ....................... 709/207 |

OTHER PUBLICATIONS

Notification of Transmittal of the International Search Report or the Declaration dated Mar. 7, 2007 from the International Searching Authority of PCT Application No. PCT/US06/04203.
Written Opinion of the International Searching Authority dated Mar. 7, 2007 of PCT Application No. PCT/US06/04203.
Notice of Allowance dated Jul. 23, 2008 from the United States Patent and Trademark Office of U.S. Appl. No. 11/883,848.

* cited by examiner

*Primary Examiner*—Nghi H Ly (57) ABSTRACT

A method for conveying a message to a user of a mobile device. The mobile device includes a display and memory. Message content is transferred from a server attached to the mobile device over a mobile network. Metadata is also transferred from the server. The metadata includes instructions for displaying the message content. The message content and the metadata are stored in the memory. The message content is read from the memory and the message is displayed on the display according to the instructions. The reading and displaying is performed by an by an application previously installed on the mobile device. The display events are logged to produce a log stored in the memory and the log is periodically transferred to the server. Preferably, the message content is provided by a customer and the message content stored on the server is targeted for the user. The customer receives the log from the server and preferably the customer subsidizes use of the mobile device based on the log.

20 Claims, 9 Drawing Sheets

SYSTEM AND METHOD FOR TRANSMITTING AND DISPLAY OF VISUAL MESSAGES ON SCREENS OF CONNECTED MOBILE DEVICES

RELATED APPLICATIONS

This Application is a National Phase of PCT Patent Application No. PCT/US2006/004203 having International Filing Date of Feb. 6, 2006, which claims the benefit of U.S. Provisional Patent Application No. 60/650,212 filed on Feb. 7, 2005. The contents of the above Applications are all incorporated herein by reference.

FIELD AND BACKGROUND OF THE INVENTION

The present invention relates to transmitting and display of visual messages, banners, commercial logos, short video messages on connected mobile devices including wireless, e.g. cellular, telephones, and personal digital assistants.

Since the advent of telephone communications and its modern day incarnation cellular communications, telecommunications have always followed the same basic business model. The model has always been characterized by a consumer paying for connectivity and services based on either the amount of time or the amount of bandwidth consumed.

In other fields of communications; namely broadcast communications the model is different in that some communication platforms provide a model through which the consumer does not pay for either connectivity or bandwidth. In these models the connectivity and bandwidth are paid for by advertising revenues. Such is the case with commercial television, commercial radio, newspapers and many popular Internet web sites.

Today's new devices, both wired and wireless, contain a myriad of features once thought impossible or not relevant. Features include multimedia messaging, video and audio support, media management, multi-channel/multi-system communications and more. Today it is quite common to find a phone with a color screen capable of displaying rich media such as animations, video clips and pictures. Such a screen has had limited effect as a commercial medium until now.

There is considerable prior art in the area of advertising using cellular telephones. In US patent application publication 20040259599, a cellular phone is composed of a housing, a keyboard, first and second display devices, a memory, a receiver-transmitter, and a controller computer. The memory stores the advertising information. The controller computer is programmed to receive the advertising information through the receiver-transmitter, to control the first display device in response to instructions received through the keyboard, and to control the second display device to display the advertising information on a screen of the second display device during a phone call established through the receiver-transmitter in response to operation of the keyboard by a user.

In US patent application publication 20040224705, an advertiser transmits advertising contents from a contents server to a portable telephone. A user displays the advertising contents on the display unit in the rear face and the like of the portable telephone in public places and the like so as to advertise the contents to a third party. The advertiser shares a part of the communication fee for compensating the user for displaying the advertisement.

In US patent application publication 20040267615, a method of presenting advertising to a consumer employs use of telephone calls, whether accessed by toll-free number, by use of calling cards or service access cards or other account access mode. When a user makes a call, and attempts to access the service, to access an account, or uses a calling card, an advertisement is presented to the user prior to allowing access to the service, prior to allowing access to the account or prior to connecting the telephone call. The user is encouraged to listen to the ad in exchange for a free telephone call service or for entry into a game of chance such as a wining number drawing.

None of the prior art references disclose unobtrusive advertising in a mobile device using the broadcast media business model.

There is thus a need for, and it would be highly advantageous to have a method of a central server and client software which together form a network through which advertising messages are transmitted from the server to the client according to commercial targeting business rules utilizing the broadcast media business model and in which the advertisements are unobtrusively displayed to the user.

Wireless Application Protocol (WAP) is an open international standard for applications that use wireless communication, for example Internet access from a mobile phone. WAP was designed to provide services equivalent to a Web browser with some mobile-specific additions, being specifically designed to address the limitations of very small portable devices.

Code division multiple access (CDMA) is a form of multiplexing and a method of multiple access that does not divide up the channel by time (as in TDMA), or frequency (as in FDMA), but instead encodes data with a certain code associated with a channel to perform the multiplexing. CDMA also refers to digital cellular telephony systems that make use of this multiple access scheme, such as those pioneered by Qualcomm, or W-CDMA.

CDMA2000 is a family of third-generation (3G) mobile telecommunications standards that use CDMA, a multiple access scheme for digital radio, to send voice, data, and signaling data (such as a dialed telephone number) between mobile phones and cell sites. It is the second generation of CDMA digital cellular.

W-CDMA (Wideband Code Division Multiple Access) is a type of 3G cellular network. W-CDMA is a wideband spread-spectrum 3G mobile telecommunication air interface that utilizes code division multiple access (or CDMA the general multiplexing scheme, not to be confused with CDMA the standard).

The Global System for Mobile Communications (GSM) is a popular standard for mobile phones in the world. GSM differs significantly from its predecessors in that both signaling and speech channels are digital, which means that it is considered a second generation (2G) mobile phone system.

DECT or Digital Enhanced (former European) Cordless Telecommunications is an ETSI standard for digital portable phones, commonly used for domestic or corporate purposes. DECT can also be used for wireless data transfers.

Integrated Digital Enhanced Network, (iDEN), is a mobile communications technology, developed by Motorola, which provides its users the benefits of a trunked radio and a cellular telephone.

Java Micro Edition (Java ME or J2ME), is a runtime and collection of Java APIs for the development of software for resource constrained devices such as PDAs, cell phones and other consumer appliances. Java ME was designed by Sun Microsystems and is a replacement for a similar technology PersonalJava.

Symbian OS is an operating system, designed for mobile devices, with associated libraries, user interface frameworks and reference implementations of common tools, produced by Symbian Ltd. Symbian is currently owned by BenQ, Ericsson, Panasonic, Nokia, Siemens AG and Sony Ericsson Windows Mobile is a compact operating system for mobile devices based on the Microsoft Win32 API. Devices which run Windows Mobile include Pocket PCs, Smartphones, and Portable Media Centers. The Microsoft .Net Compact Framework is a streamlined version of the .NET Framework that is designed to run on mobile devices with limited memory, resources, and battery power, including smart devices like personal digital assistants (PDAs), mobile phones, and set-top boxes. The .NET Compact Framework includes the base class libraries from the full .NET Framework and a few libraries designed specifically for mobile devices such as Windows CE InputPanel.

(Reference: Wikipedia)

The term "user" as used herein is the consumer of a mobile device, e.g. cellular telephone.

The term "customer" as used herein is the entity that provides message content, e.g advertisements for displaying on the mobile device.

The term "idle" when referring to a mobile device means that the device is not undergoing active communications intended for the users, i.e. not talking and not receiving a message from another service, e.g SMS.

SUMMARY OF THE INVENTION

According to the present invention there is provided a method for conveying a message to a user of a mobile device. The mobile device includes a display and memory. Message content is transferred from a server communicating with the mobile device over a mobile network. Metadata is also transferred from the server. The metadata includes instructions for displaying the message content. The message content and the metadata are stored in the memory. The message content is read from the memory and the message is displayed on the display according to the instructions. The reading and displaying are performed by an application previously installed on the mobile device. The display events are logged to produce a log stored in the memory and the log is periodically transferred to the server. Preferably, the message content is personalized for the user and stored on the server. Preferably, the message content is provided by a customer and the message content stored on the server is targeted for the user. The customer receives the log from the server and preferably the customer subsidizes use of the mobile device based on the log. Preferably, transferring message content is performed solely when the mobile device is otherwise idle. Preferably, the displaying is performed solely while the mobile device is idle, receiving an incoming communication, and/or ending an incoming communication. Preferably, the user responds to the message by selecting a link presented in the message. Preferably, the displaying is performed solely when a light is on illuminating the display, and the displaying does not turn on the light.

Preferably, the message content and metadata is periodically updated solely when the mobile device is idle, by storing updated message content and updated data in the memory.

According to the present invention there is provided a mobile device connected to a server through a mobile communications network, the mobile device including a memory and a display. An application is installed in the mobile device which includes a transfer mechanism which transfers message content and metadata from the server communicating with the mobile device. The metadata includes instructions for displaying the message content; a storage mechanism which stores the message content and the metadata in the memory; a display mechanism which reads the message content and displays the message content on the display; and a log mechanism which logs display events performed by the display mechanism, and thereby stores a log using the storage mechanism in the memory. The transfer mechanism periodically transfers the log to the server.

According to the present invention there is provided a program storage device readable by a mobile computerized device, tangibly embodying a program of instructions executable by the device to perform a method for conveying a message to a user of the mobile device, the mobile device including a display and memory, the method as disclosed herein.

According to the present invention there is provide a program storage device readable by a machine, tangibly embodying a program of instructions executable by the machine to receive the message content from the customer and provide the log to the customer.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system including a central server and client software which together form a network through which advertising messages are transmitted from the server to the client according to commercial targeting business rules. The server delivers the messages as a "playlist". A "playlist" is a file including directives (meta data) directing specific messages to be displayed at specific times and durations. Client software installed in the mobile device requires the mobile device to be connected occasionally to the server via a data, e.g. HTTP connection.

The client software either downloads a playlist or the playlist is received via SMS, GPRS or another alternate communications method from the server. Downloading or updating of the playlist is handled on a periodic schedule (e.g. once a day) in order to preserve battery power and ensure scalability of the platform. The client device then downloads the relevant message content (text, image or video files). The client device displays the messages according to the instructions within the playlist.

The client software replaces existing "Screen Saver" and "Wallpaper" on the mobile devices. The client software typically displays the visual messages while the device is in "stand by". Alternatively or in addition the software displays the visual messages while the device is receiving an incoming call alert or other message alert (e.g. SMS) (Receive Call mode) and the user typically looks at the display to see from whom is the incoming call/SMS. Alternatively or in addition, the software displays the visual messages when the device is ending a call (Call Summary mode). The messages are preferably unobtrusive banners, commercial companies' logos, a short video message in the background and/or in a portion of the display, e.g. in the upper or lower part of the screen, thus not inhibiting the use of the device. The display of the messages preferably does not limit other functionality of the device since the visual message is displayed in the background while the foreground maintains the existing functional buttons, messages and interactions. The client software preferably tracks or logs the impressions (i.e. views) of each advertising message and sends the log of impressions periodically to the server. The messages are displayed in the end user's preferred or default language and the message content is preferably targeted or personalized to the user and follow the user to wherever he/she is located, at home or roaming around the globe. Preferably, the messages are only displayed when the devices back light is on by default, therefore the device does not consume significant power for displaying a message. The messages may include action buttons serving as a "trigger" or link in the message for commercial purposes such as linking the user to more information on a WAP site or sending an immediate SMS message to participate in an offer. Such interactivity conforms to the "service policy" of providing unobtrusive messages. Action button triggers may be used for commerce purposes enabling the user to "buy now" or enabling the user to get "more info" for informational purposes.

Client software makes use of the built-in graphic functions of the phone or device including three-dimensional graphics. The client software is preferably protected from illegal tampering or removal by the end user. An end user that would like to remove the software will have to contact his provider/carrier. If the software is disabled, e.g. by tampering the provider/carrier is preferably notified since usage logs show no activity from the user. In such case the provider/carrier may seek to terminate the contract or stop reimbursement of user on advertising messages viewed.

The server provides a management application enabling advertisers to target campaigns based on user profile, demographics and usage patterns. The server manages media and tracks "performance" of advertising campaigns by logging impressions (views of a specific advertising message). Reports can be used for integration with a billing platform for reimbursement of the client for advertising viewed. The server provides "self service" capabilities for advertisers enabling them to "freeze" and "unfreeze" campaigns, view campaign performance reports, track targeting rules and manage campaign strategy. The system is designed preferably on servers with the capacity of up to 100,000 end users simultaneously. Supported platforms include different kinds of mobile devices using technologies including but not limited to CDMA, TDMA, GSM, iDEN, DECT, VoIP. The platform is compatible with and J2ME, Windows Mobile .Net, Symbian OS, Palm OS and native device intrinsic technologies.

The principles and operation of a system and method of unobtrusive advertising on a mobile device according to a broadcast media business model, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, principal intentions of the present invention are to: (1) provide the mobile device as a commercial medium which utilizes the broadcast media business model, i.e. consumer, network, advertiser, (2) subsidize cost to the final consumer, i.e. user of the cellular telephone and augment cost to the customer, e.g. corporate advertiser, with advertising revenue (3) offer a targeted, mobile and inherently personal, interactive, accountable media; (4) Ad display/delivery and tracking is based on playlist/cache/offline model rather than an on-line model and consequently does not require a network/data connection with constraints such as a limited bandwidth. (5) provide displayed advertisements which are interactive and serve as a trigger for mobile commerce via WAP and or outbound SMS. (6) support multiple client device operating systems (e.g. Symbian, Windows Mobile, BREW and different platforms (e.g. Palm, Smartphones, 3G cellular telephones, PDAs)(7) provide unobtrusive advertising that does not limit use of telephone for voice/data communications. Advertising on receiving an incoming call creates an effective "captive" audience while the advertisement does not hinder the desired action on behalf of the user, answering the call.

It should be noted that while the discussion herein is directed to commercial advertisements, the principles of the present invention may be adapted for use in, and provide benefit for display of, non-commercial advertisements, e.g. BLOOD DRIVE TODAY for non-profit organizations, governmental and/or public welfare messages, e.g. VOTE TODAY!, public opinion surveys and other types of messages with optional interactive responses.

The present invention may be applied to address certain social issues related to lowering communications expenses for those who have difficulty affording the service.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Figure 1:
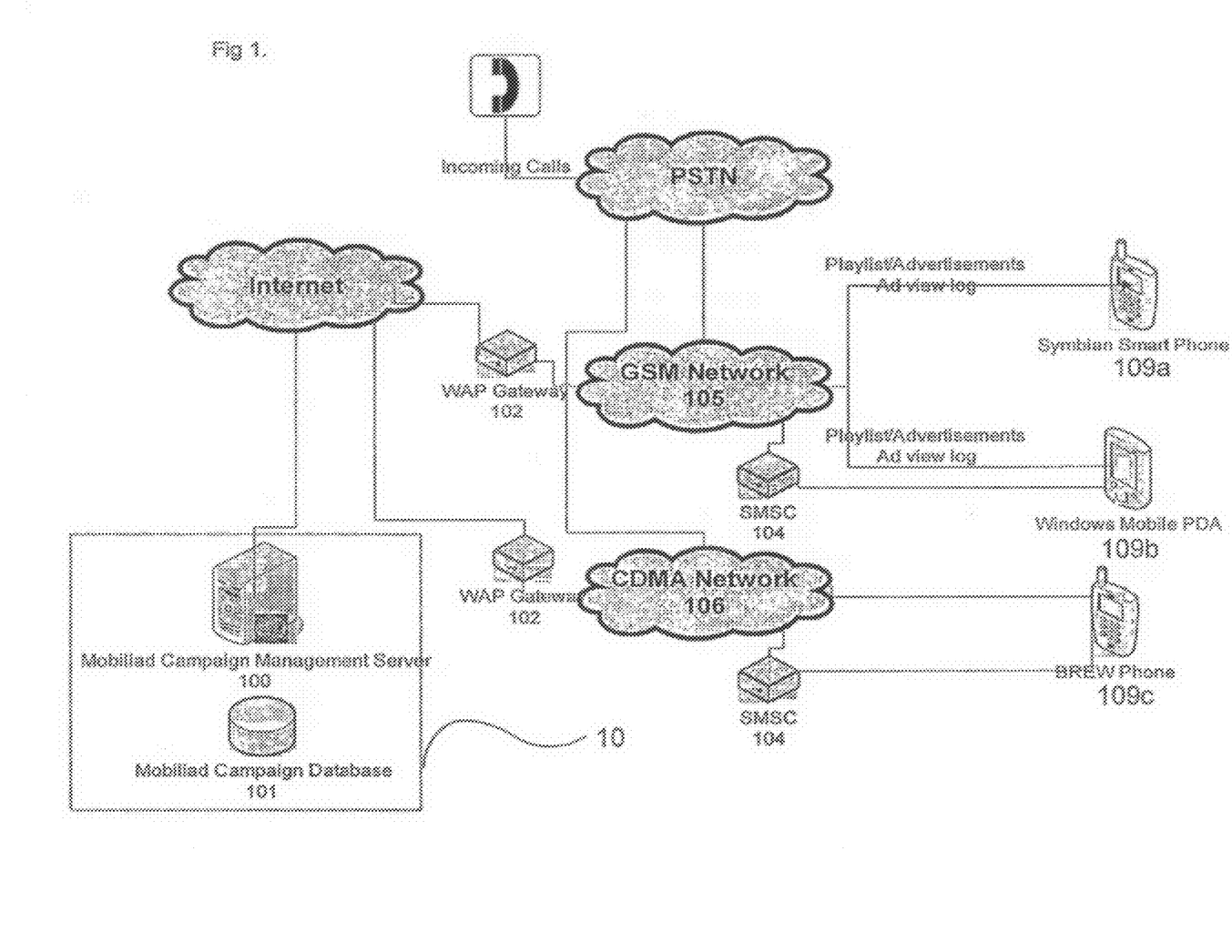
FIG. 1 is a simplified system drawing, according to embodiments of the present invention.

Referring now to the drawings, FIG. 1 is a simplified system block diagram, according to embodiments of the present invention. Campaign management server 10 is responsible for defining, deploying and managing campaigns by the customer. Server 10 includes a software application operating over standard personal computer (PC) server hardware 100 and offers a management interface for advertisers to define, manage and deploy campaign playlists and media. Server 10 communicates with clients 109 over a network, e.g. GSM network 105 or CDMA network 106. WAP Gateway 102 is a part of existing mobile operator infrastructure enabling the connection between client 109 and server 10 over standard HTTP protocols operating on GPRS or CDMA data networks. A Short Message Service Center (SMSC) 104 is a network element in mobile telephone network 106/106 which delivers text or SMS messages. When a user sends an SMS message to another user, the telephone, e.g. client 109 actually sends the message to SMSC 104. SMSC 104 stores the message and then delivers the message to client 109 when available, as a store and forward operation SMSC 104 enables the sending and receiving of messages between server 10 and client 109. According to embodiments of the present invention SMS messages are optionally used for transferring playlist directive data between campaign server 10 and client 109. SMS messages may also be used for triggering display of an advertisement, according to an embodiment of the present invention.

Figure 2:
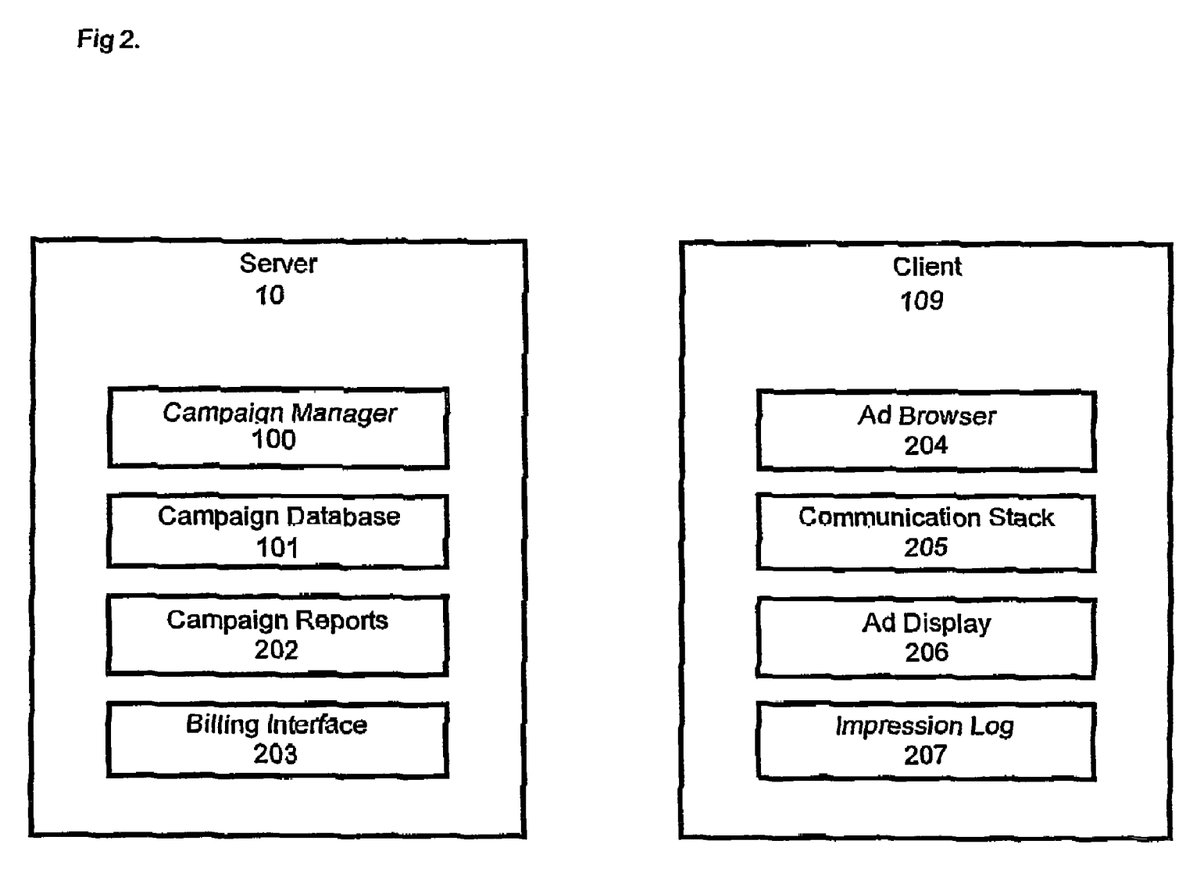
FIG. 2 is a block diagram showing as modules a server and client device, according to embodiments of the present invention.

Reference is now also made to FIG. 2, a block diagram showing details of server 10 and clients 109. Campaign manager module 100 is the main interface for customers, i.e. advertisers to define, manage, track and deploy campaigns on the system, according to embodiments of the present invention. Campaigns define which advertisements are shown and when they are shown to each target audience. A campaign database 101, a repository where all campaign data is stored, is a logical database operating over a standard database platform (e.g. mySQL, Oracle or MSSQL) which stores the campaign meta data and data including playlist directives, actual campaign resources (images) per client device and display size, impression logs and administrative data. Campaign Reports module 202 is an interface for generating reports for the purpose of gauging effectiveness and reach of the marketing campaign. Reports module 202 includes ability to define and issue reports based on the target audience, campaign, campaign resources, time frame, target device, target platform and keywords. Billing Interface 203 is an interface to existing and future billing/service platforms in order to enable mutual compensation as applicable to serve the business model of augmenting the customer cost of telecommunications with advertising revenue (and lowering cost of telecommunications to the consumer)

In client 109, ad browser client module 204 is an interactive application enabling the user to browse through all advertisements which are available on his/her device 109. Ad browser client module 204 enables the user to respond to the advertisement (when applicable) by launching a link to a WAP site connected with the advertisement or by issuing an SMS message connected with the advertisement Playlist directives as defined in campaign manager 100 detail links (URLs) for both WAP sites and SMS target addresses. Communication stack 205 is the module responsible for communication with campaign server 10 when device 109 is idle according to pre-defined schedule. Ad display 206 is a basic module of the client responsible for displaying advertising message according to pre-defined events—an incoming call, an incoming SMS, end of call, idle, and/or screensaver mode. Advertisements are displayed as directed in the playlist. Impression log module 207 is responsible for logging all ad views on client 109 for later aggregation by campaign server 10.

Figure 3:
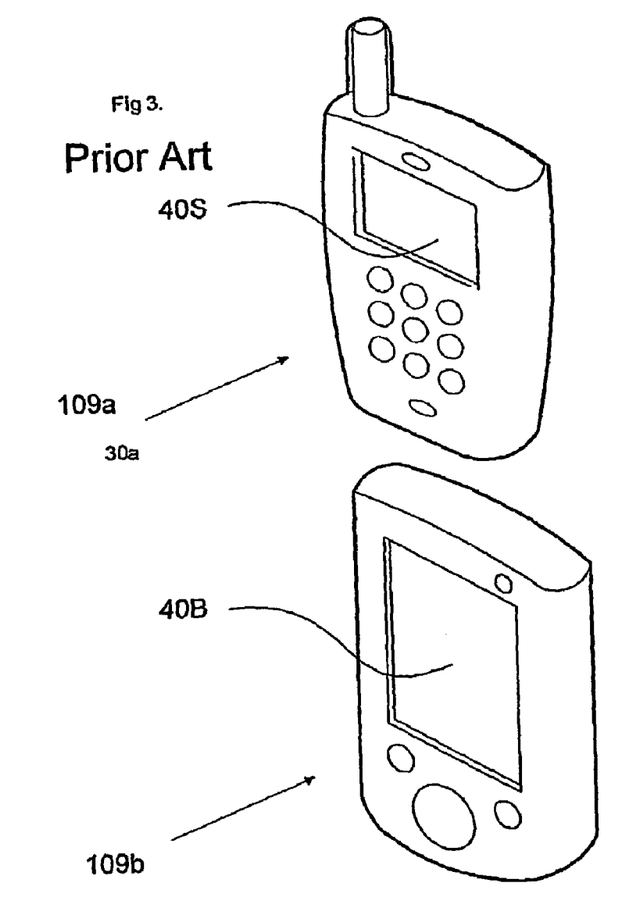
FIG. 3 is a prior art drawing showing devices of different display size, wherein embodiments of the present invention are applicable.

Reference is now made to FIG. 3 which shows in more physical detail clients Smart Phone 109a and PDA 109b. According to a feature in embodiments of the present invention, ad display 206 installed in client 109 adjusts to the size of all types of screens in use from the smallest display screen 40S to the biggest display screens 40B.

Figure 4:
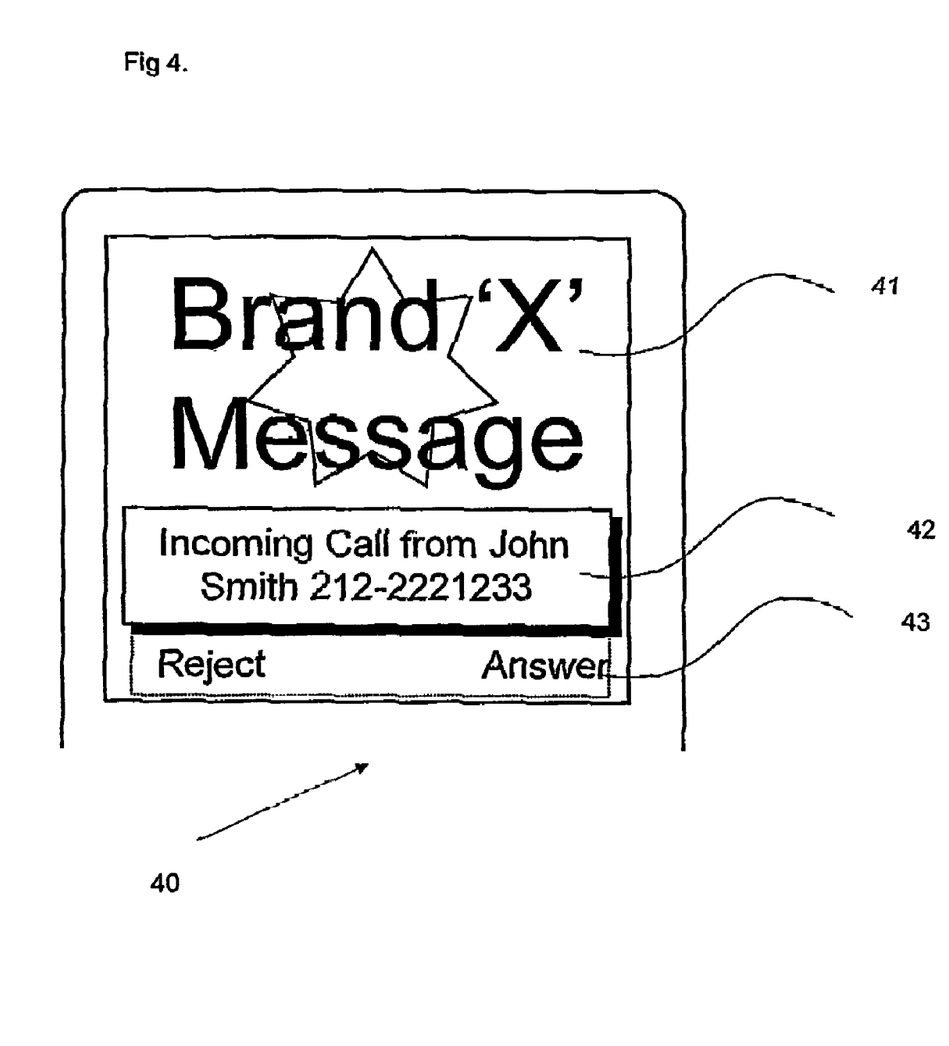
FIG. 4 is a display screen layout of a mobile device, according to embodiments of the present invention.

Reference is now made to FIG. 4 which illustrates display screen 40, according to an embodiment of the present invention. An image 41 is displayed which advertises BRAND X, just before an incoming call from John Smith is answered. An original incoming call alert dialog 42 of device 109 appears and action buttons 43 "Answer" and "Reject" function unobstrusively without any interference by appearance of advertisement 41.

Figure 5:
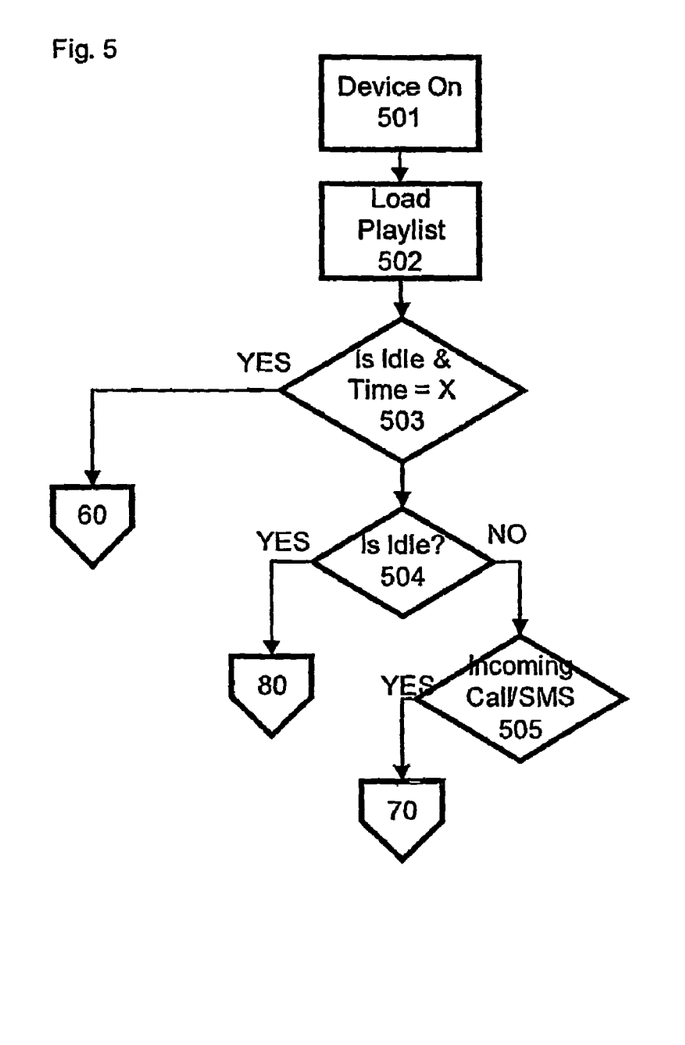
FIG. 5 is a high level block diagram showing operation of the present invention, according to embodiments of the present invention.
Figure 6:
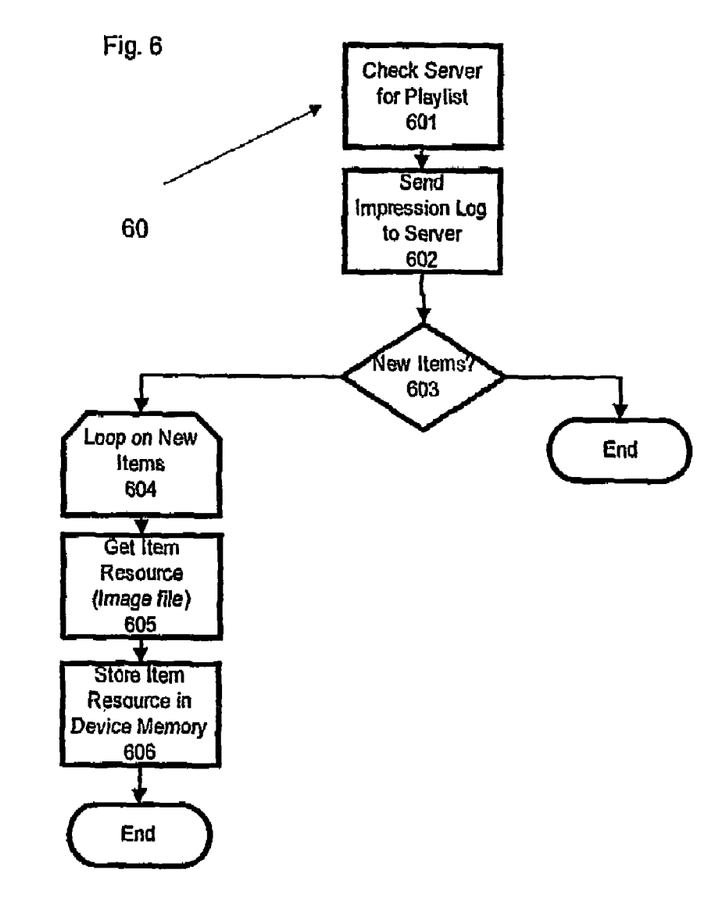
FIG. 6 is a block diagram illustrating updating of message content according to embodiments of the present invention.
Figure 7:
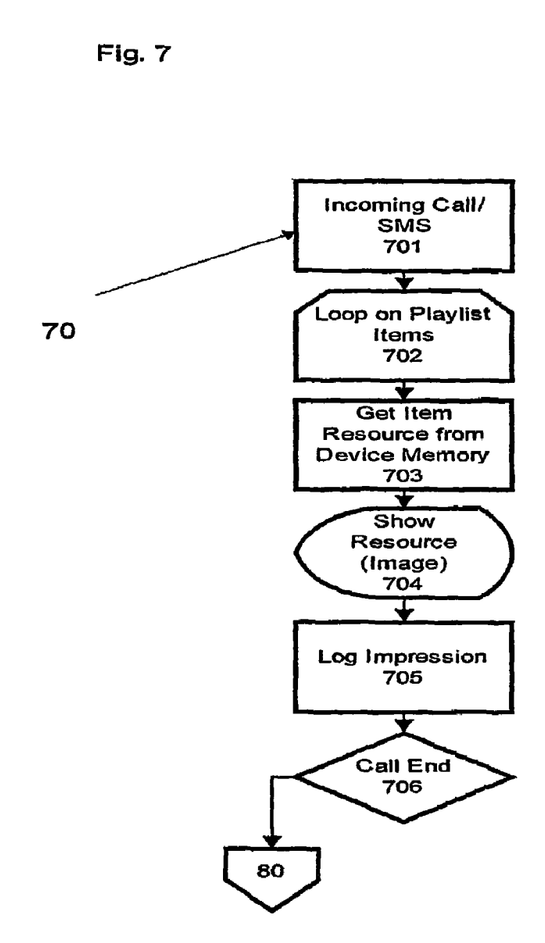
FIG. 7 is a block diagram illustrating a process of displaying messages upon receiving an incoming telephone call or text message, according to embodiments of the present invention.
Figure 8:
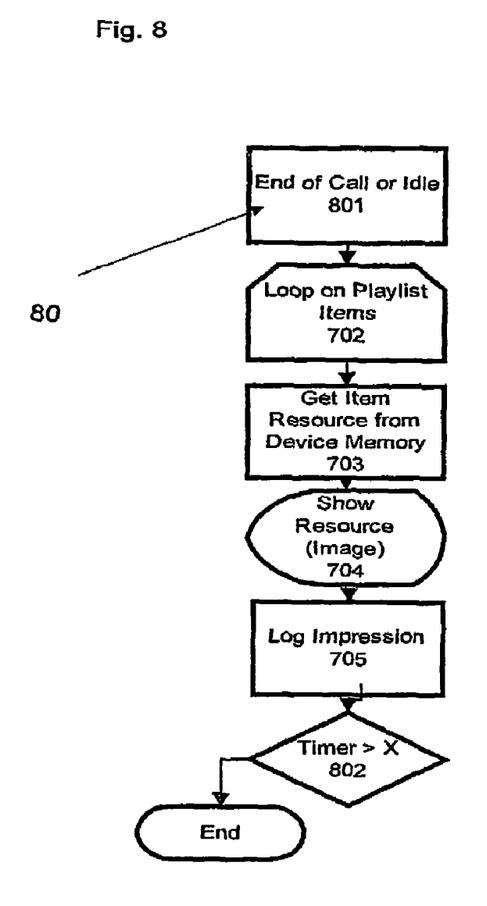
FIG. 8 is a block diagram of illustrating a process of displaying a message while idle or upon ending an incoming call or an incoming text message, according to embodiments of the present invention.

Operation of the present invention is illustrated in flow diagrams of FIGS. 5-8. Referring now to FIG. 5, while device 109 is on (step 501), a playlist and advertisement content is initially loaded (step 502). In decision box 503, the application installed in device 109, checks if device 109 is idle and if the time period is reached for updating (process 60 of FIG. 6) the playlist. If idle in decision box 503, then server 10 is checked (step 601) for an update of the playlist and the impression log is sent (step 602) to the server. If there are no new items with message content (decision box 603) then update process 60 ends. Otherwise, if there are new items (decision box 603) the application loops (step 604) on the new items, retrieves (step 605) the new item resources, e.g. image file, stores (step 606) the new item resources in device 109 memory. Referring back to FIG. 5, in decision box 504, when device 504 is idle and an incoming call or incoming SMS is alerted in step 701 of process 70 in FIG. 7, then the application installed in device 109 loops through the playlist items (step 702), retrieves (step 703) the appropriate item from device 109 memory for display and displays (step 704) resource or image. In step 705, the impression or display event is logged. Process 70 ends (step 706) by calling process 80 when device 109 returns to an idle state. Process 80 is shown in FIG. 8. In step 801, an incoming call is ended. The application installed in device 109 loops (step 702) on playlist items, retrieves (step 703) an item from device 109 memory, displays the retrieved item (step 704), logs the display event or impression 705. The retrieved image is displayed for a duration (step 802) according to meta data including in the playlist, for a predetermined period of time, and/or while the back light is still on.

Figure 9:
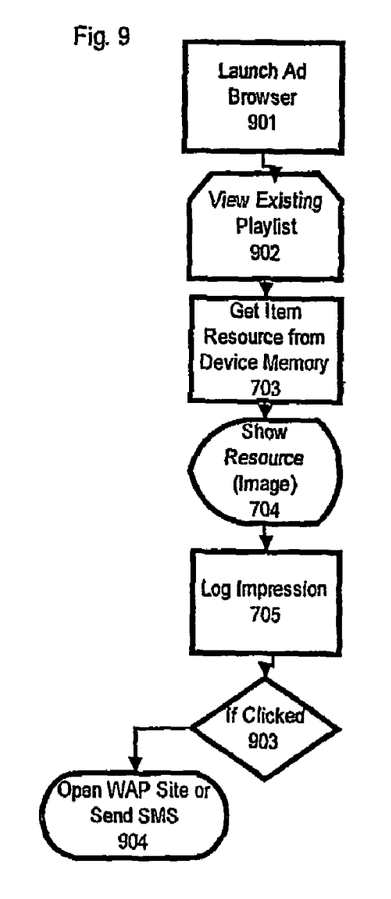
FIG. 9 is a block diagram of a process showing operation of an advertisement browser module installed in the mobile device, according to embodiments of the present invention.

Reference is now made to FIG. 9 which illustrates an advertisement browser application installed as a feature in device 109 as, ad browser 204 part of campaign manager 100. A user launches (step 901) an advertisement browser and views the existing playlist (step 902). A requested item is retrieved (step 703) from device 109 memory, the requested item is displayed (step 704), the display event or impression is logged (step 705) and if selected, e.g. clicked a WAP site is opened or an SMS is sent by the user requesting further information or purchase of the item selected and displayed.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A method for conveying a message to a user of a mobile device, the mobile device including a display and memory, the method comprising:
   (a) transferring message content from a server operatively attached to the mobile device;
   (b) transferring metadata from said server, wherein said metadata includes instructions for displaying of the message content;
   (c) storing said message content and said metadata in the memory;
   (d) reading said message content from the memory according to said instructions, thereby displaying said message on said display; wherein said reading is performed by an application previously installed on the mobile device;
   (e) logging said displaying, thereby producing a log stored in the memory; and
   (f) periodically transferring said log to said server.

2. The method, according to claim 1, further comprising:
   (g) personalizing said message content for the user; and
   (h) storing said message content on said server.

3. The method, according to claim 1, further comprising:
   (g) providing said message content by a customer;
   (h) storing said message content on said server;
   whereby said message content is targeted for the user.

4. The method, according to claim 3, further comprising:
   (i) said customer receiving said log from said server; and
   (j) said customer subsidizing use of the mobile device by the user based on said log.

5. A program storage device readable by a machine, tangibly embodying a program of instructions executable by the machine to receive the message content and provide the log to the customer, according to the method of claim 3.

6. The method, according to claim 1, wherein said transferring message content is performed solely when the mobile device is idle.

7. The method, according to claim 1, wherein said displaying is performed solely during at least one state of the mobile device, said at least one state selected from the group consisting of the mobile device being: idle, receiving an incoming communication, and ending an incoming communication.

8. The method, according to claim 1, further comprising:
   (g) the user responding to said message by selecting a link presented in said message.

9. The method, according to claim 1, wherein said displaying is performed solely when a light is on illuminating said display, and wherein said displaying does not include turning on said light.

10. The method, according to claim 1, further including:
    (g) periodically updating said message content and said metadata from said server, solely when the mobile device is idle, by storing updated message content and updated data in the memory.

11. The method of claim 1, wherein said meta data includes an indication of what type of trigger to use for displaying.

12. The method of claim 11, wherein said indication includes two or more of "incoming call", "incoming SMS", "incoming message", screensaver mode and "call end".

13. The method of claim 1, wherein said displaying comprises displaying as a background.

14. The method of claim 1, comprising refreshing said message content and said meta data by push from the server.

15. The method of claim 1, comprising periodically refreshing said message content and said meta data as a playlist.

16. The method of claim 1, comprising adjusting said content for display on said mobile device.

17. The method of claim 1, comprising sending an SMS message by a user in response to said display by selecting said displayed message.

18. The method of claim 1, comprising including in said log an indication if the advertisement was viewed when presented, even when not selected.

19. A mobile device operatively attached to a server through a mobile communications network, the mobile device including a memory and a display, wherein an application is installed in the mobile device, the application including:
    (a) transfer mechanism which transfers message content and metadata from a server operatively attached to the mobile device; wherein said metadata includes instructions for displaying of the message content;
    (b) a storage mechanism which stores said message content and said metadata in the memory;
    (c) a display mechanism which reads said message content and displays said message content on the display; and
    (d) a log mechanism which logs display events performed by said display mechanism, and thereby stores a log using said storage mechanism in the memory;
    wherein said transfer mechanism periodically transfers said log to the server.

20. A program storage device readable by a machine, tangibly embodying a program of instructions executable by the machine to perform a method for conveying a message to a user of a mobile device, the mobile device including a display and memory, the method comprising:
    (a) transferring message content from a server operatively attached to the mobile device;
    (b) transferring metadata from said server, wherein said metadata includes instructions for displaying of the message content;
    (c) storing said message content and said metadata in the memory;
    (d) reading said message content from the memory according to said instructions, thereby said displaying said message on said display; wherein said reading is performed by an application previously installed on the mobile device;
    (e) logging said displaying, thereby producing a log stored in the memory; and
    (f) periodically transferring said log to said server.

* * * * *